United States Patent
Chang

(10) Patent No.: US 6,611,130 B2
(45) Date of Patent: Aug. 26, 2003

(54) ZERO VOLTAGE, ZERO CURRENT SWITCHING POWER FACTOR CORRECTION CONVERTER WITH LOW CONDUCTION LOSS AND LOW SWITCHING LOSS

(75) Inventor: Yu-Ming Chang, Pingjen (TW)

(73) Assignee: Delta Electronics, Inc., Taoyuan Shien (TW)

( * ) Notice: Subject to any disclaimer, the term of this patent is extended or adjusted under 35 U.S.C. 154(b) by 114 days.

(21) Appl. No.: 09/969,309

(22) Filed: Oct. 1, 2001

(65) Prior Publication Data

US 2002/0145407 A1 Oct. 10, 2002

(30) Foreign Application Priority Data

Apr. 6, 2001 (TW) ........................................ 90108363 A

(51) Int. Cl.[7] .............................. G05F 1/10; G05F 1/24
(52) U.S. Cl. ...................... 323/235; 323/225; 323/259
(58) Field of Search .............................. 323/222, 225, 323/235, 247, 259, 282, 232

(56) References Cited

U.S. PATENT DOCUMENTS 6,028,418 A * 2/2000 Jovanovic et al. .......... 323/222
6,236,191 B1 * 5/2001 Chaffai ....................... 323/222
6,498,463 B2 * 12/2002 Chang ........................ 323/222

* cited by examiner

Primary Examiner—Jessica Han
(74) Attorney, Agent, or Firm—Trojan Law Offices

(57) ABSTRACT

A zero voltage, zero current switching power factor correction converter includes a boost unit including a first switch, a second switch and a resonant circuit at least having two energy storage elements, wherein the resonant unit is operatively configured to alternatively discharge electric energy from one of the energy storage elements to a load, a boost unit having a boost choke for receiving an AC voltage, a rectifying circuit coupled between the boost choke and the resonant unit, a third switch and a fourth switch respectively connected across one of the energy storage elements, and a power factor correction controller for respectively enabling the first switch and the second switch to turn on and off when a current flowing through the first switch is zero and a current flowing through the second switch is zero, and respectively enabling the third switch and the fourth switch to turn on and off when a voltage across the third switch is zero and a voltage across the fourth switch is zero.

30 Claims, 17 Drawing Sheets

ZERO VOLTAGE, ZERO CURRENT SWITCHING POWER FACTOR CORRECTION CONVERTER WITH LOW CONDUCTION LOSS AND LOW SWITCHING LOSS

This application claims priority to Taiwan patent application Serial No. 090108363, filed Apr. 6, 2001.

FIELD OF THE INVENTION

The present invention is in association with a zero voltage, zero current switching power factor correction converter, and more particularly to a zero voltage, zero current switching power factor correction converter with low conduction loss and low switching loss.

DESCRIPTION OF THE RELATED ART

As shown in FIG. 1, a single-phase boost converter for carrying out power factor correction is illustrated. In FIG. 1, when the main switch $S_m$ turns on, the current will flow through two input diodes $D_3$ and $D_2$, boost choke $L_1$ and main switch $S_m$; when the main switch $S_m$ turns off, the current will flow through two input diodes $D_4$ and $D_1$, boost choke $L_1$ and output diode $D'''$. Unquestionably, the power converter of FIG. 1 will result in a greater conduction loss.

Turning now to FIG. 2, another type of a single-phase boost converter for carrying out power factor correction is illustrated. Comparing to FIG. 1, though the power converter of FIG. 2 has a lower conduction loss, the rectifying diode of FIG. 2 has an inherent reverse recovery time (trr) problem, and a hyper fast recovery diode is required to be incorporated to reduce the switching loss for the main switches $S_1$ and $S_2$. Unfortunately, the hyper fast recovery diode has a significantly larger forward voltage ($V_F$) than the input diodes of FIG. 1. Consequently, the power converter of FIG. 2 can not attain an anticipative performance. In other words, the power converter of FIG. 2 actually does not lead to the advantage of low conduction loss, and further the problems of electromagnetic interference (EMI) and radio frequency interference (RFI) still have not been addressed.

There is a tendency to provide a zero voltage, zero current switching power factor correction converter, which is operatively configured to drive the switches of the boost converter adapted for performing power factor correction to turn on and off in a zero voltage circumstances or in a zero current circumstances, and thereby lowering the conduction loss and the switching loss, miniaturizing the magnetic element, suppressing EMI and RFI and obtaining a better conversion efficiency.

SUMMARY OF THE INVENTION

An object of the present invention is the provision of a boost converter for carrying out the power factor correction, which has a lower conduction loss, lower switching loss, suppressed EMI, suppressed RFI, miniaturized magnetic element and an improved overall efficiency.

Another object of the present invention is the provision of a power factor correction converter which is operatively configured to drive the switches of the boost converter for use with the purpose of power factor correction to turn on and off in a zero voltage circumstances or in a zero current circumstances, and reducing the conduction loss caused by the current flowing through the switches, so as to optimize the overall performance of the power factor correction converter.

A first object of the present invention may be achieved by a boost converter which encompasses a resonant unit comprising a first switch, a second switch, a resonant circuit includes at least two energy storage elements, wherein the resonant unit is operatively configured to alternatively discharge electric energy from one of the energy storage elements to a load; and a boost unit comprising a boost choke for receiving an alternating current (AC) voltage, a rectifying circuit coupled between the boost choke and the resonant unit, a third switch and a fourth switch respectively connected across one of the energy storage elements.

With the intention of reducing the switching loss taken place at the instant that the switches are switching their on/off states, the resonant unit is operatively configured to respectively turn the first switch and the second switch on and off under a zero current circumstances, and the boost unit is operatively configured to respectively turn the third switch and the fourth switch on and off under a zero voltage circumstances.

In accordance with a first aspect of the present invention, the load is consisted of a first output capacitor, a second output capacitor and a resistor load (which may be a DC/DC converter), and the boost unit may optionally includes an inductor coupled between one side of the alternating current voltage and a circuit node of the fourth switch for reducing a common-mode noise of the boost converter. The resonant circuit includes an inductor, a first capacitor and a second capacitor. For simplicity, the output load "resistor" (which may be a DC/DC converter) is not shown in the drawings.

According to a first embodiment of the present invention, both the first switch and the second switch comprise a unidirectional switch. The unidirectional switch may be formed from a silicon-controlled rectifier or an insulated gate bipolar transistor with a relatively high collector-emitter reverse-biased voltage with gate opened ($V_{CEO}$). An alternative for forming the unidirectional switch may comprise an insulated gate bipolar transistor or a metal-oxide-semiconductor field effect transistor (MOSFET)f. If the unidirectional switch is directed to an insulated gate bipolar transistor or a metal-oxide-semiconductor field effect transistor, a rectifying device such as a diode is required to couple in series with the second switch.

The rectifying circuit of the boost unit includes a first rectifier, a second rectifier and a third rectifier. In one preferred embodiment of the present invention, each of these rectifiers is implemented by an ultra fast recovery diode. In other preferred embodiments of the present invention, each of these rectifiers can be implemented by a MOSFET.

The boost converter of the present invention further comprises a first auxiliary rectifier and a second auxiliary rectifier, which can also be implemented by an ultra fast recovery diode.

Optionally, the boost converter of the present invention can further comprises a saturation inductor coupled between the inductor of the resonant circuit and the load for reducing a high-frequency ringing of the resonant circuit.

A second object of the present invention may be attained by a power factor correction converter, comprising a resonant unit which comprises a first switch, a second switch and a resonant circuit comprising at least two energy storage elements, wherein the resonant unit is operatively configured to alternatively discharge electric energy from one of the energy storage elements to a load; a boost unit comprising a boost choke for receiving an alternating current voltage, a rectifying circuit coupled between the boost choke and the resonant unit, a third switch and a fourth switch respectively connected across one of the energy storage elements; and a power factor correction controller which issues a first switch control signal to drive the first switch to turn on and off when a current flowing through the first switch is zero and issues a second switch control signal to drive the second switch to turn on and off when a current flowing through the second switch is zero, and issues a third switch control signal to drive the third switch to turn on and off when a voltage across the third switch is zero and issues a fourth switch control signal to drive the fourth switch to turn on and off when a voltage across the fourth switch is zero.

The power factor correction converter according to an exemplary embodiment of the present invention further includes a zero voltage detector which detects a voltage across the third switch and a voltage across the fourth switch, and issues a first control signal to drive the power factor correction controller to issue the third switch control signal when the voltage across the third switch is zero and issues a second control signal to drive the power factor correction controller to issue the fourth switch control signal when the voltage across the fourth switch is zero. More specifically, the resonant unit is operatively configured to respectively turn the first switch and the second switch on and off under a zero current circumstances.

The load according to a preferred embodiment of the present invention may comprise a first output capacitor, a second output capacitor and a resistor load. Optionally, the boost unit may further comprise an inductor coupled between one side of the alternating current voltage and a circuit node of the fourth switch for reducing a common-mode noise of the power factor correction converter. Moreover, the resonant circuit may comprise an inductor, a first capacitor and a second capacitor. The first capacitor and the second capacitor can be further combined into an equivalent capacitor.

More preferably, both the first switch and the second switch comprise a unidirectional switch. The unidirectional switch may be formed from a silicon-controlled rectifier or an insulated gate bipolar transistor with a relatively high collector-emitter reverse-biased voltage with gate opened ($V_{CEO}$). An alternative for implementing the unidirectional switch may comprise an insulated gate bipolar transistor or a metal-oxide-semiconductor field effect transistor. If the unidirectional switch is directed to an insulated gate bipolar transistor or a metal-oxide-semiconductor field effect transistor, a rectifying device such as a diode is required to couple in series with the second switch.

The abovementioned rectifying circuit is formed from a first rectifier, a second rectifier and a third rectifier. Each of these rectifiers is comprised of an ultra fast recovery diode or a metal-oxide-semiconductor field effect transistor. Preferably, the boost unit may comprise a first auxiliary rectifier and a second auxiliary rectifier each of which is also implemented by an ultra fast recovery diode.

Optionally, the resonant unit further includes a saturation inductor coupled between the inductor of the resonant circuit and the load for reducing a high-frequency ringing of the resonant circuit.

Now the foregoing and other features and advantages of the present invention will be more clearly understood through the following descriptions with reference to the accompanying drawings, wherein:

DETAILED DESCRIPTION OF THE PREFERRED EMBODIMENT

Figure 3:
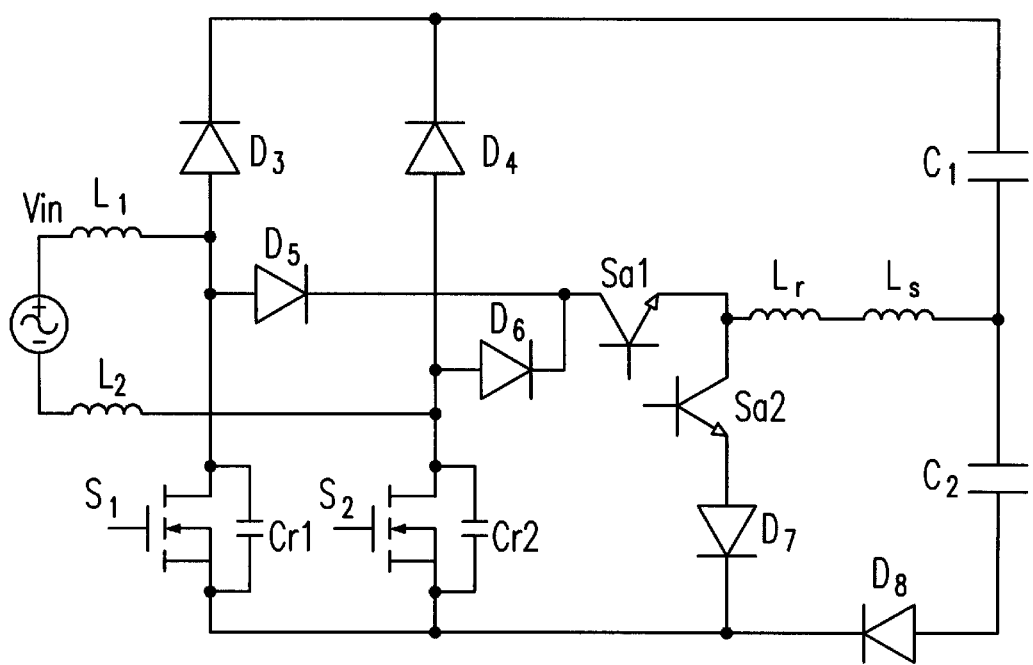
FIG. 3 illustrates a circuit topology of a boost converter for use in a power factor correction converter according to a preferred embodiment of the present invention.
Figure 4:
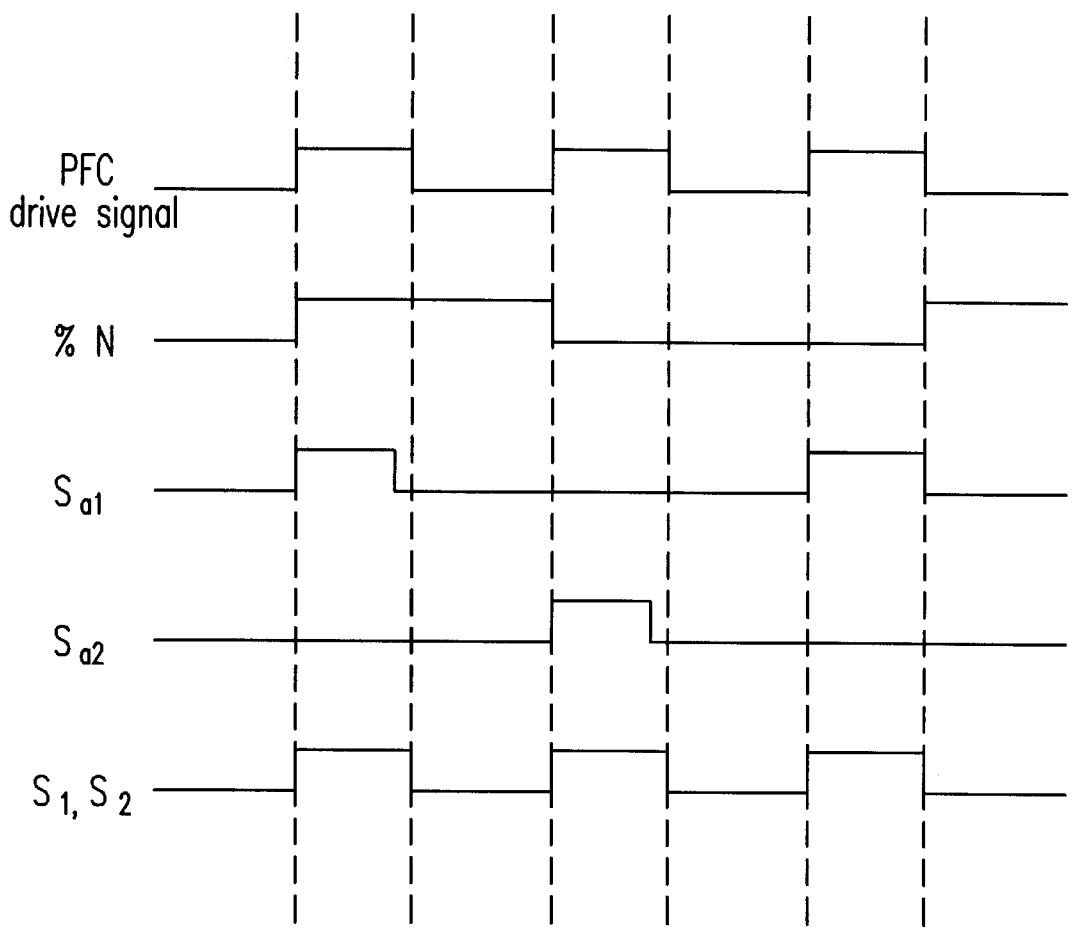
FIG. 4 exhibits a timing diagram for all the driving signals in the power factor correction converter according to a preferred embodiment of the present invention.
Figure 5:
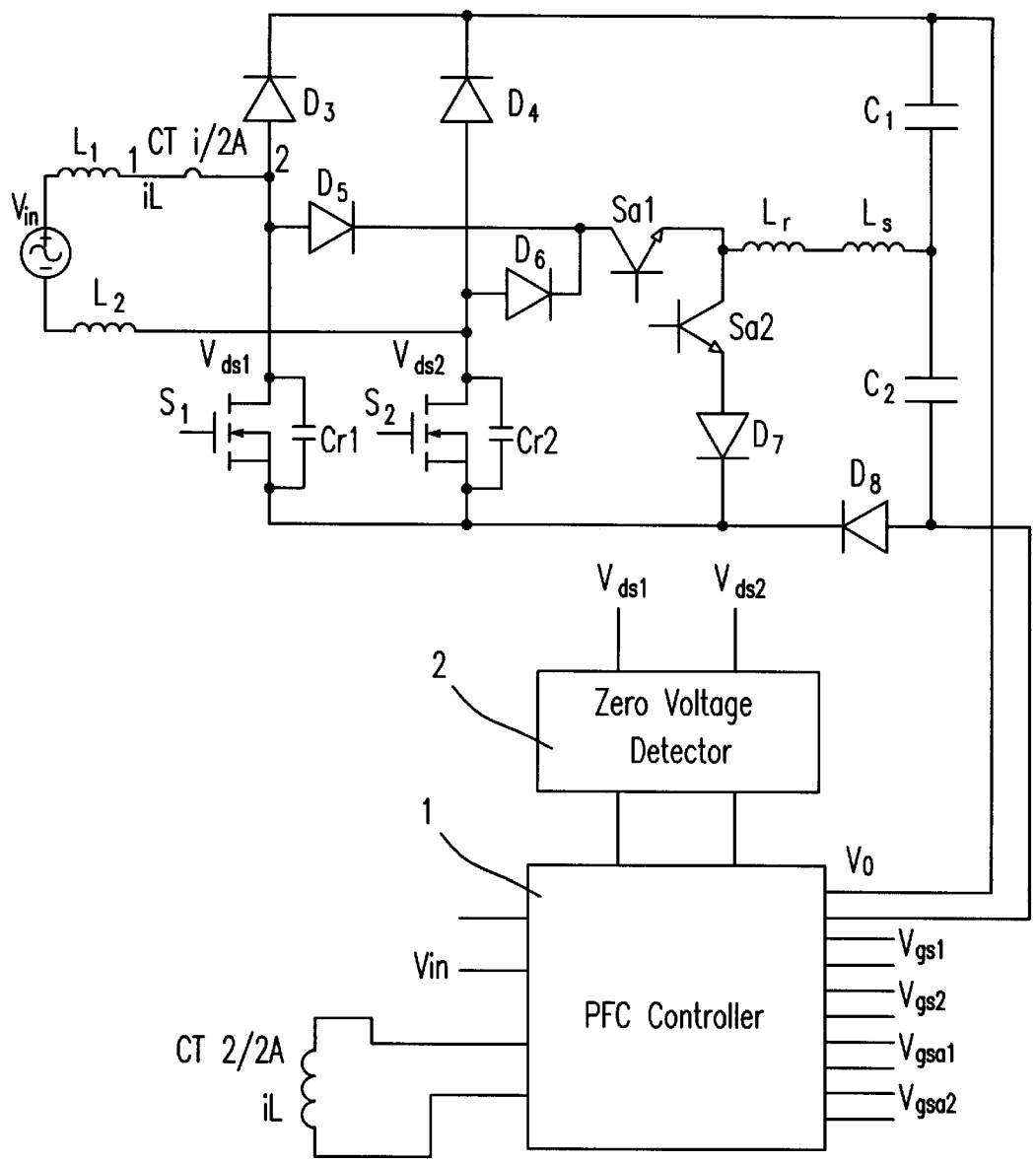
FIG. 5 depicts a circuit block diagram of the power factor correction converter according to a preferred embodiment of the present invention.

Turning to FIG. 3, FIG. 4 and FIG. 5. FIG. 3 illustrates a circuit topology of a boost converter for use in a power factor correction converter according to a preferred embodiment of the present invention. FIG. 4 exhibits the timing diagram for all the driving signals in the power factor correction converter according to a preferred embodiment of the present invention. Also FIG. 5 shows a circuit block diagram of the power factor correction converter according to a preferred embodiment of the present invention. In FIG. 3, the boost converter for use with the purpose of power factor correction encompasses a resonant unit including a first switch $S_{a1}$, a second switch $S_{a2}$ and a resonant circuit. The resonant circuit includes a resonant inductor $L_r$, a first resonant capacitor $C_{r1}$ and a second resonant capacitor $C_{r2}$. Both the resonant inductor and resonant capacitor of the resonant circuit serve as energy storage elements, and the resonant circuit is configured to alternatively discharge electric energy from either the resonant inductor or the resonant capacitor to the load comprising a first output capacitor $C_1$ and a second output capacitor $C_2$. The boost converter of FIG. 3 further comprises a boost unit including a boost choke $L_1$ for receiving an alternating current (AC) voltage $V_{in}$, a rectifying circuit coupled between the boost choke $L_1$ and the resonant unit, and a third switch $S_1$ and a fourth switch $S_2$ respectively connected across the first resonant capacitor $C_{r1}$ and the second resonant capacitor $C_{r2}$. The rectifying circuit includes a first rectifying diode $D_3$, a second rectifying diode $D_4$ and a third rectifying diode $D_8$. In addition to these rectifying diodes, the boost converter of FIG. 3 further includes a first auxiliary rectifying diode $D_5$ and a second auxiliary rectifying diode $D_6$. For the reason of reducing the conduction loss of the boost converter, each of these rectifying diodes of the boost converter is formed from an ultra fast recovery diode which has a lower forward voltage $V_F$. And for the sake of reducing the switching loss taken place at the instant that these switches are changing their on/off states, the resonant unit is configured to change the on/off state of the first switch $S_{a1}$ and the second switch $S_{a2}$ under a zero current circumstances, while the boost unit is configured to change the on/off state of the third switch $S_1$ and the fourth switch $S_2$ under a zero voltage circumstances.

In this illustrative embodiment, both the third switch $S_1$ and the fourth switch $S_2$ are fulfilled with a MOSFET. Both the first switch $S_{a1}$ and the second switch $S_{a2}$ are comprised of a unidirectional switch, which can be a silicon-controlled rectifier (SCR) or an insulated gate bipolar transistor (IGBT) with a relatively high collector-emitter reverse-biased voltage with gate opened ($V_{CEO}$). If so, the diode $D_7$ shown in FIG. 3 can be removed. Another alternative for implementing the first switch $S_{a1}$ and the second switch $S_{a2}$ can be directed to a common insulated gate bipolar transistor (IGBT) or a MOSFET. If so, the boost converter of FIG. 3 has to contain a diode $D_7$ which is coupled in series with the second switch $S_{a2}$. The boost converter of FIG. 3 may optionally include an inductor $L_2$ coupled between one side of the AC voltage $V_{in}$ and a circuit node of the fourth switch $S_2$ for reducing the common-mode noise of the boost converter. The boost converter of FIG. 3 can further comprise a saturation inductor $L_s$, which is also an optional magnetic element, for reducing the high-frequency ringing of the resonant circuit.

In FIG. 5, a circuit block diagram of the power factor correction converter of the present invention is shown. It can be seen from FIG. 5 that the boost converter of FIG. 3 is controlled by a power factor correction controller (PFC controller) 1 with the intention of accomplishing the power factor correction. The PFC controller 1 is formed from some discrete circuit elements such as a PFC IC, a switching signal waveform generator, a driving signal generating circuit and so forth. With regard to the circuit design of the PFC controller 1, it is of little interest to the present invention, and we are not inclined to have a further discussion herein. The power factor correction converter of FIG. 5 further includes a zero-voltage detector 2 which detects the drain-source voltage of both the third switch $S_1$ and the fourth switch $S_2$ (which respectively implies the voltage across the first resonant capacitor $C_{r1}$ and the voltage across the second resonant capacitor $C_{r2}$) and respectively detects if the drain-source voltage of the third switch $S_1$ or the fourth switch $S_2$ is zero. The PFC controller 1 is used to respectively output the individual switch control signals to the first switch $S_{a1}$, the second switch $S_{a2}$, the third switch $S_1$ and the fourth switch $S_2$, so as to drive these switches to turn on and off.

FIG. 4 exhibits the timing diagram for all the driving signals in the power factor correction converter according to a preferred embodiment of the present invention. The driving signals for the first switch $S_{a1}$ and the second switch $S_{a2}$ are derived by doing a logic AND operation with the PFC drive signal and the frequency-dividing signal %N, and where N=2 in FIG. 4.

FIG. 6(a) to FIG. 6(l) schematically illustrate the positive half-cycle operation of the boost converter according to the present invention. The operation of the boost converter of the present invention in the positive half-cycle are divided into twelve operating modes, and thus the boost converter of the present invention sequentially operates depending on the twelve operating modes as depicted in FIG. 6(a) to FIG. 6(l). These operation modes will now be fully described in the following with reference to the drawings of FIG. 6(a) to FIG. 6(l).

Figure 1:
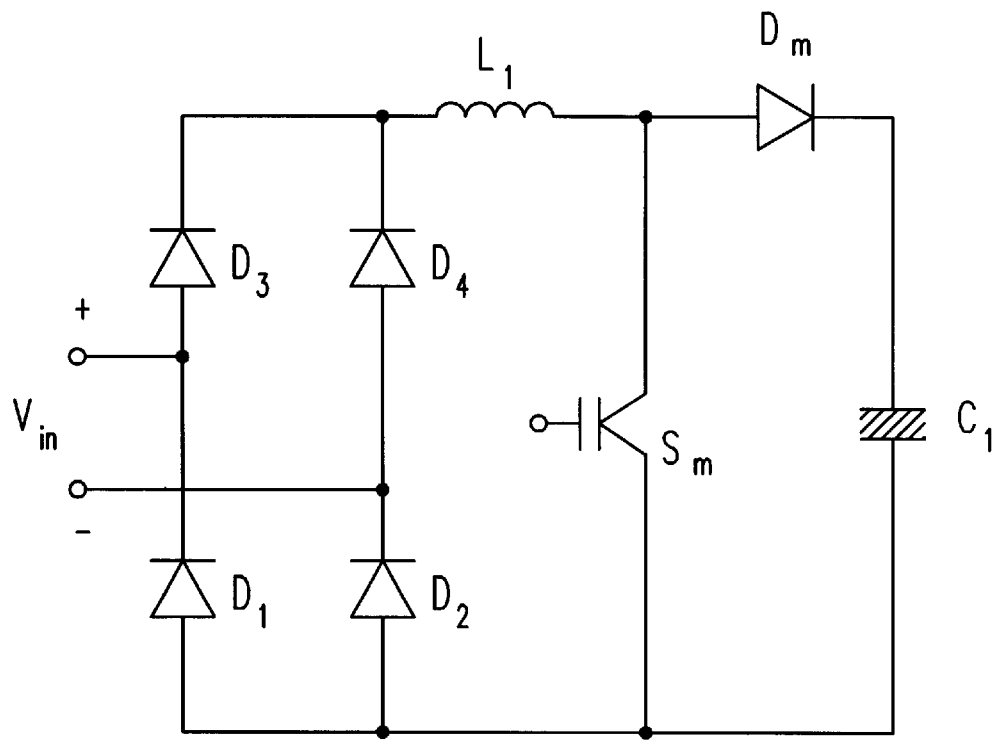
FIG. 1 shows a conventional single-phase boost converter for carrying out power factor correction.
Figure 2:
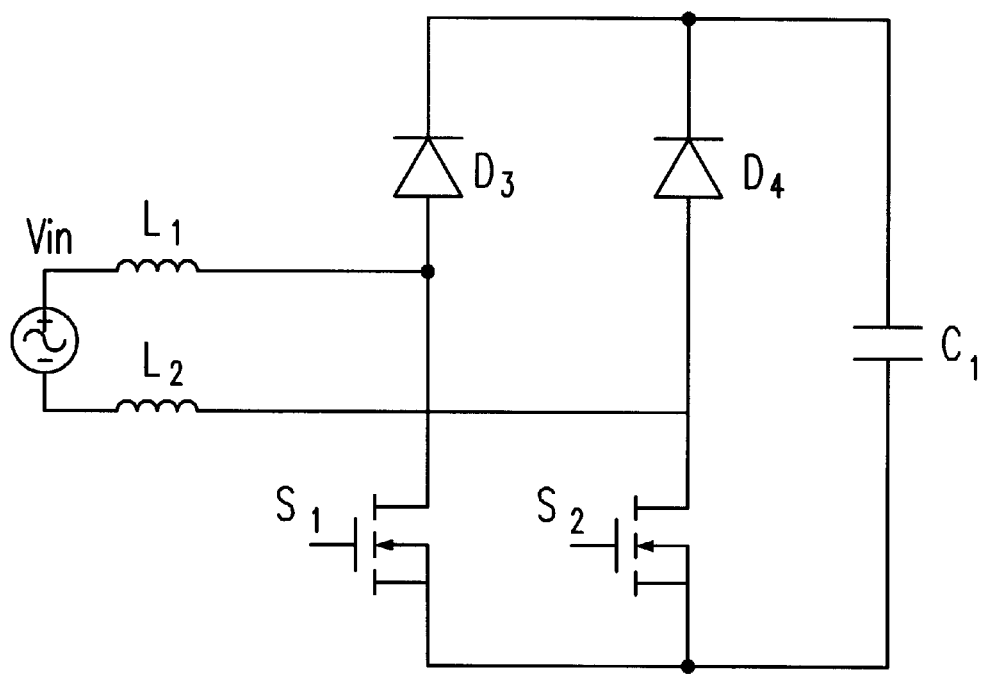
FIG. 2 shows another type of the conventional single-phase boost converter for carrying out power factor correction.
Figure 6A:
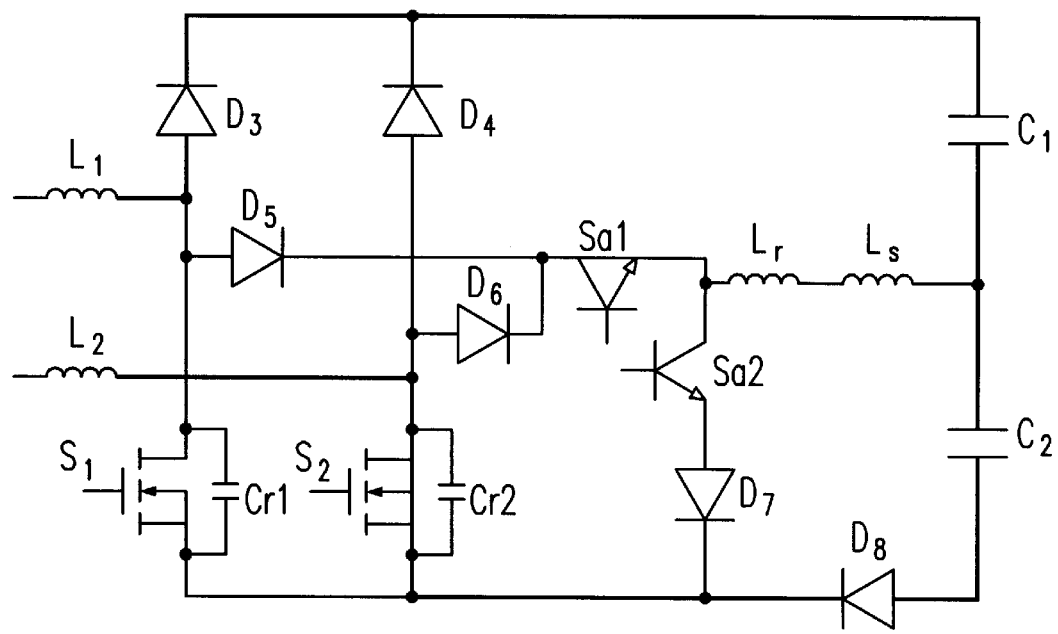
FIG. 6(a) to 6(l) schematically illustrate the positive half-cycle operation of the boost converter according to the present invention.

Please refer to FIG. 6(a). This operating mode is operatively identical to the conventional single-phase boost converter of FIG. 2 operating in the discharge mode. In this operating mode, the energy stored in the boost choke $L_1$ will be discharged to the output capacitor $C_1$ and $C_2$ through the rectifying diode $D_3$, $D_8$ and the switch $S_2$.

Figure 6B:
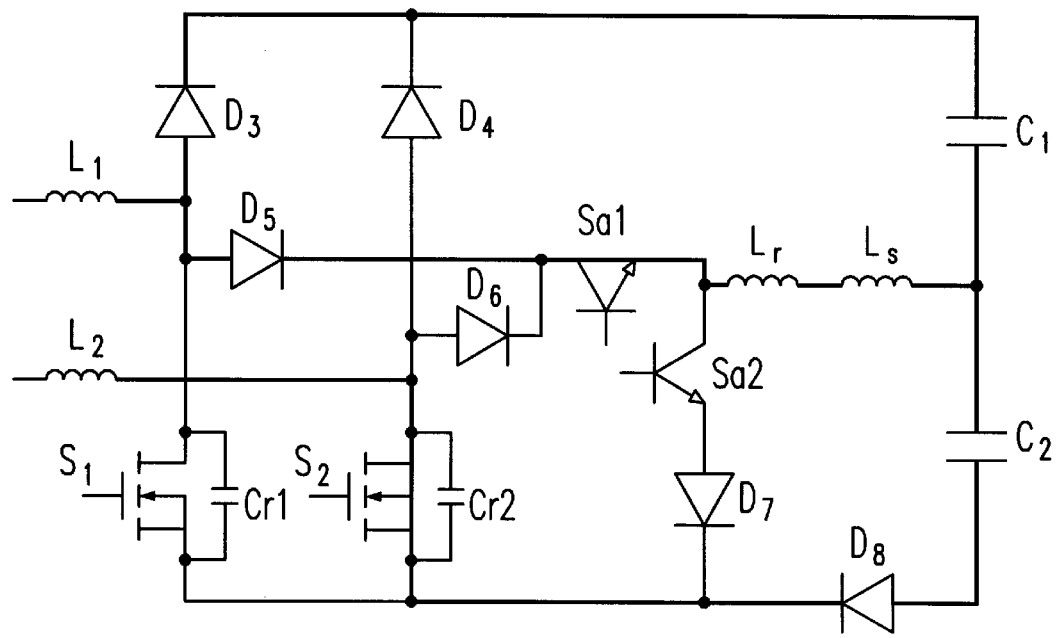

Please refer to FIG. 6(b). The unidirectional switch $S_{a1}$ will turn on under a zero current circumstances, and the current flowing through the resonant inductor $L_r$ will be increased in a linear fashion. As the current $iL_r$ flowing through the resonant inductor $L_r$ is increased up to be equal with the current $iL$ flowing through the boost choke $L_1$, this operating mode will be terminated.

Figure 6C:
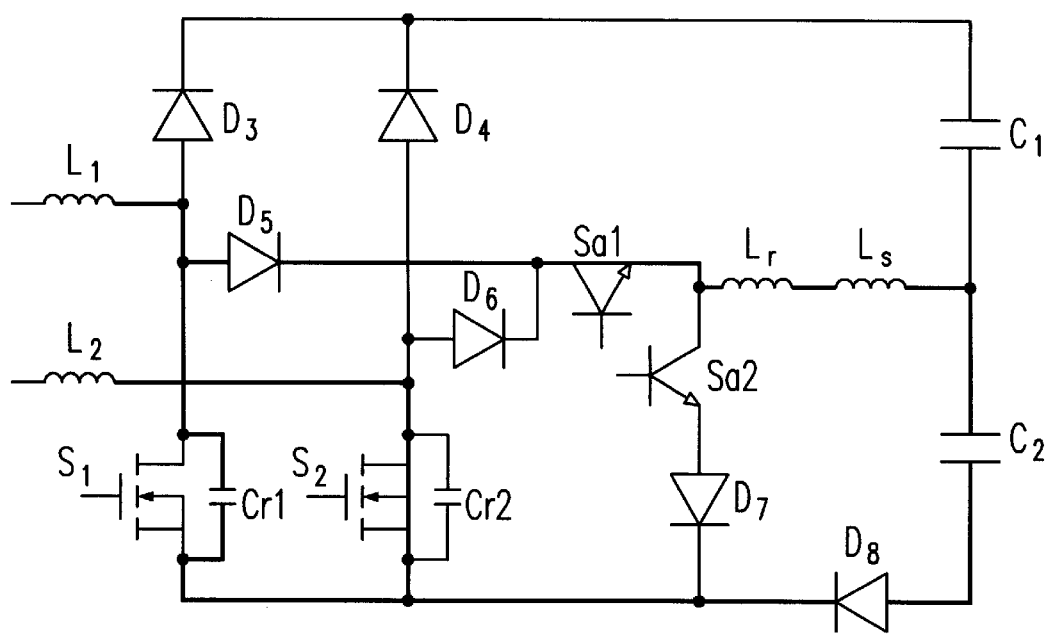

Please refer to FIG. 6(c). The resonant capacitor $C_{r1}$ will come into resonance with the resonant inductor $L_r$, which will cause the energy stored in the resonant capacitor $C_{r1}$ to be discharged until approximately zero. This operating mode terminates as the switch $S_1$ turns on.

Figure 6D:
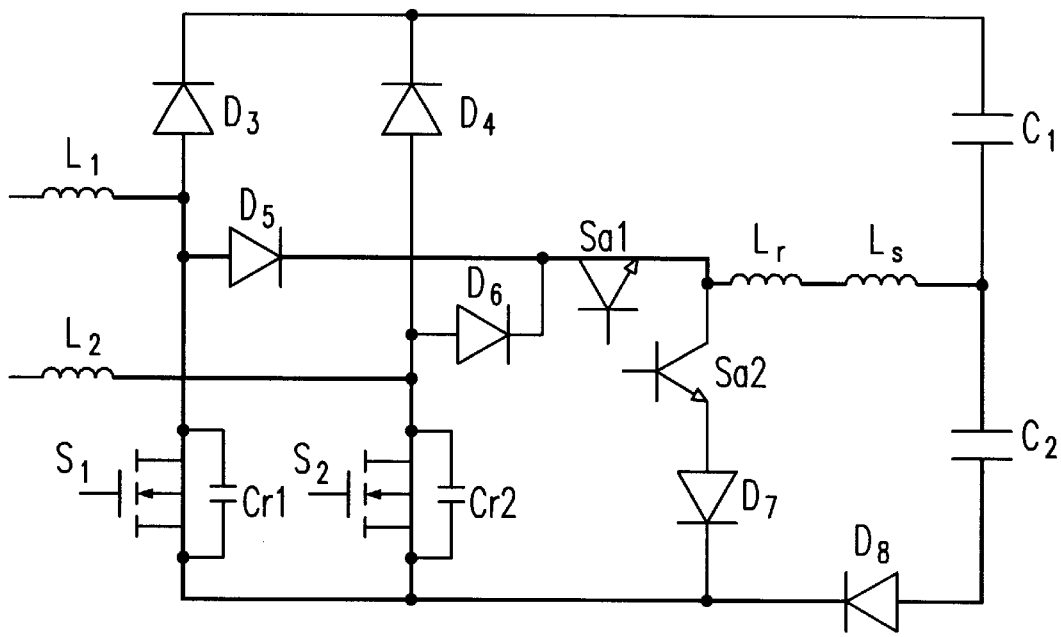

Please refer to FIG. 6(d). When the voltage across the resonant capacitor $C_{r1}$ is approaching zero, the switch $S_1$ is driven to turn on by detecting if the voltage across the resonant capacitor $C_{r1}$ (which is also indicative of the drain-source voltage of the switch $S_1$) is approaching zero. This operating mode starts as the switch $S_1$ turns on, and the electric energy stored in the resonant inductor $L_r$ will be discharged to the output capacitor $C_2$ through switch $S_1$. This operating mode terminates as the electric energy stored in the inductor $L_r$ is fully discharged. Because the switch $S_{a1}$ is a unidirectional switch, even the driving signal for the switch $S_{a1}$ is high, the switch $S_{a1}$ is still turned off, and further it is turned off under a zero current circumstances.

Figure 6E:
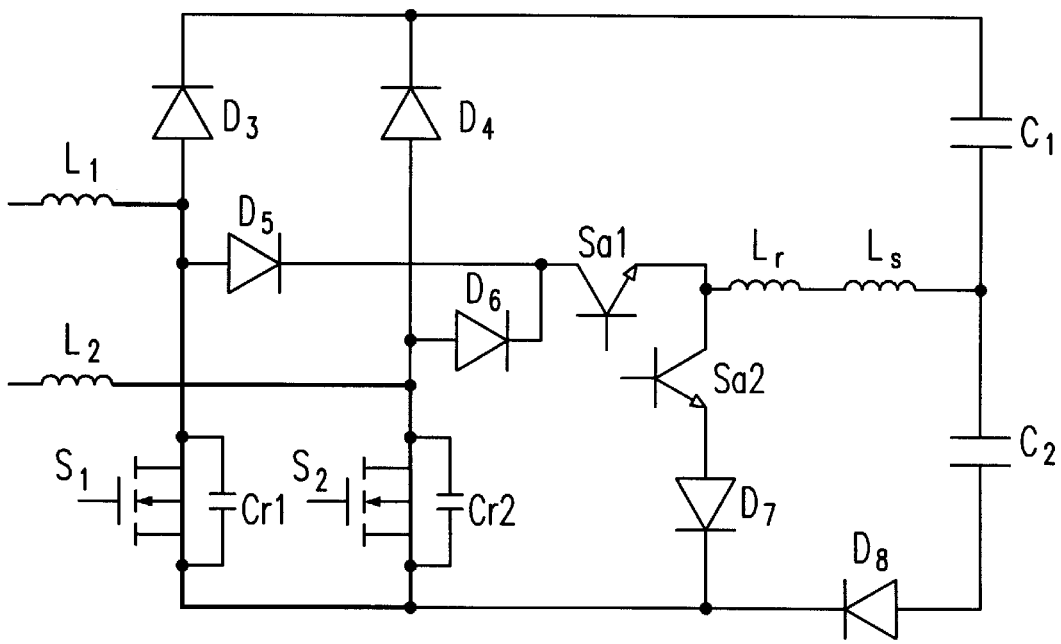

Please refer to FIG. 6(e). This operating mode starts as the energy stored in the resonant inductor $L_r$ is discharged until zero. This operating mode is operatively identical to the charge mode of the conventional boost converter. This operating mode terminates as the PFC driving signal is deasserted.

Figure 6F:
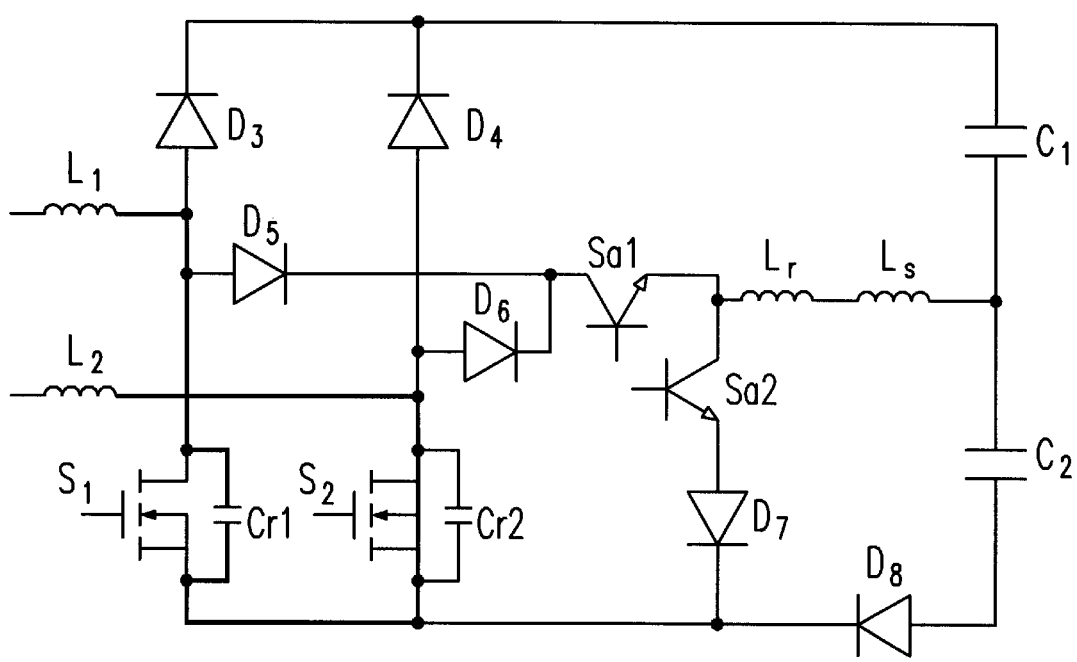

Please refer to FIG. 6(f). This operating mode starts as the switch $S_1$ turns off, meanwhile the resonant capacitor $C_{r1}$ will be charged by the boost choke $L_1$. When the voltage across the resonant capacitor $C_{r1}$ is equal to the output voltage $V_O$, this operating mode will be terminated.

Figure 6G:
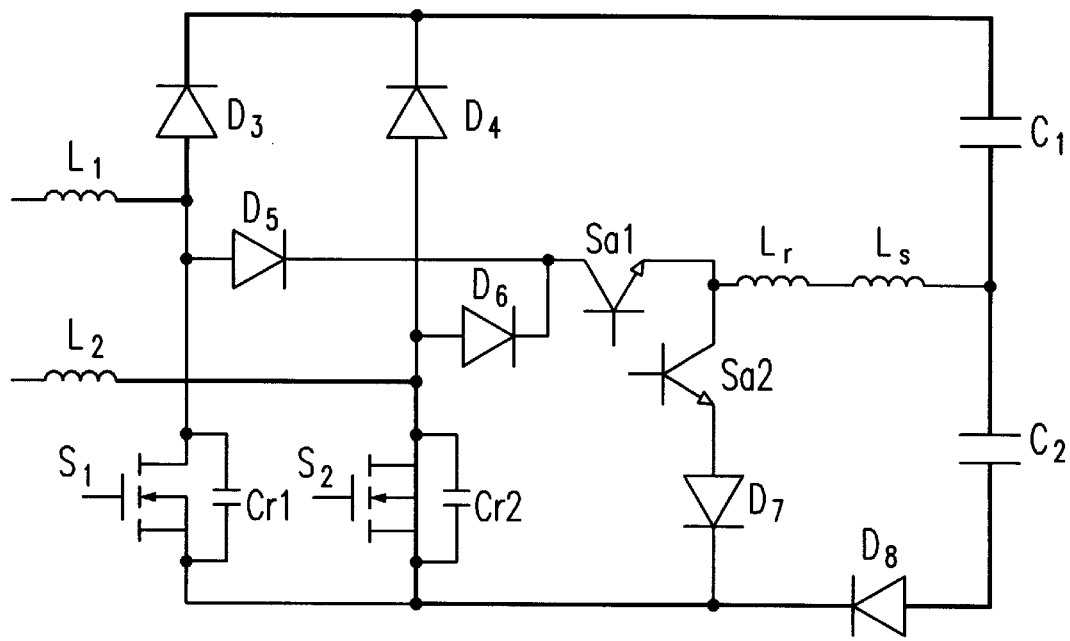

Please refer to FIG. 6(g). When the voltage across the resonant capacitor $C_{r1}$ is equal to the output voltage $V_O$, it will not go up anymore but will be clamped by the output voltage $V_O$. This operating mode is operatively identical to the operating mode of FIG. 6(a).

Figure 6H:
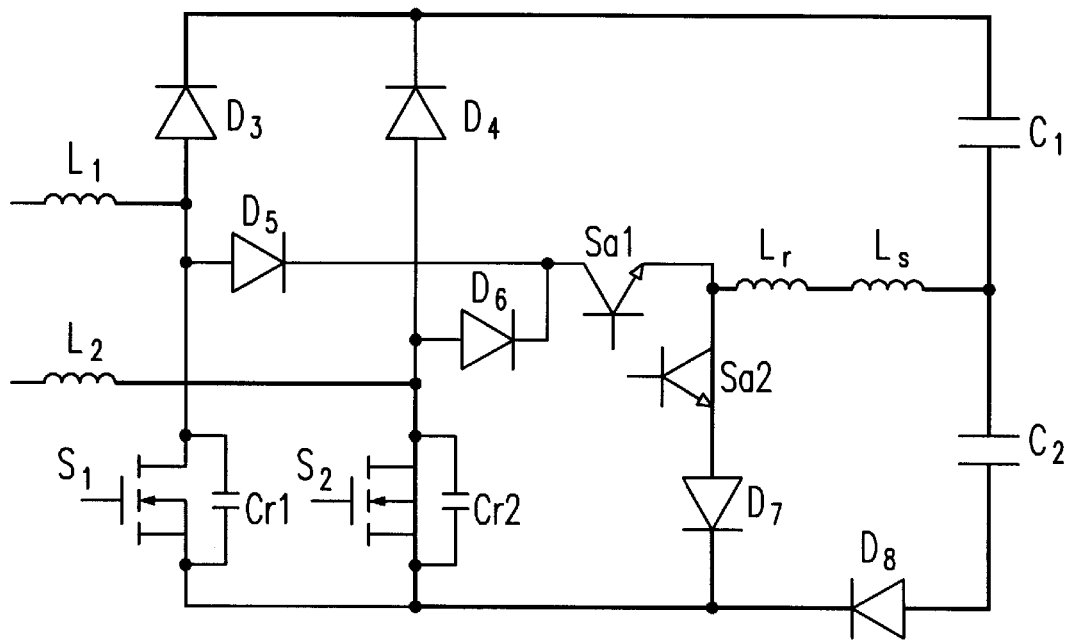

Please refer to FIG. 6(h). This operating mode is similar to the operating mode of FIG. 6(b), except that the switch to be turned on is the switch $S_{a2}$ instead of the switch $S_{a1}$. As similar to the operating mode of FIG. 6(b), the unidirectional switch $S_{a2}$ will turn on under a zero current circumstances, and the current flowing through the resonant inductor $L_r$ will be increased in a linear fashion. As the current $iL_r$ flowing through the resonant inductor $L_r$ is increased up to be equal with the current iL flowing through the boost choke $L_1$, this operating mode will be terminated.

Figure 6I:
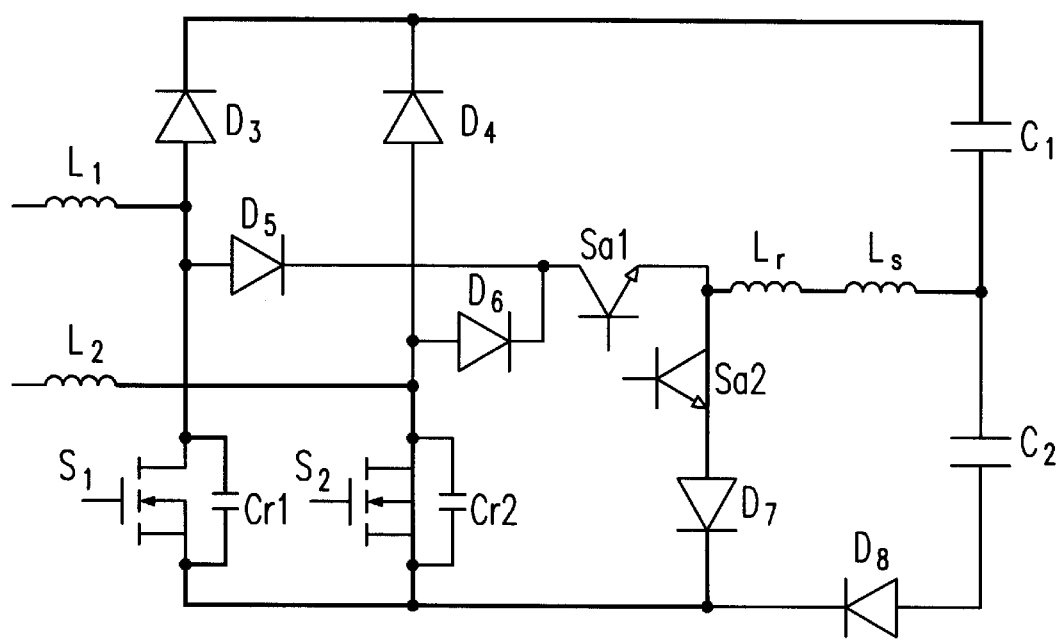

Please refer to FIG. 6(i). This operating mode is similar to the operating mode of FIG. 6(c). The resonant capacitor $C_{r1}$ will come into resonance with the resonant inductor $L_r$ through the rectifying diode $D_3$, the output capacitor $C_1$, the unidirectional switch $S_{a2}$ and the diode $D_7$ to enable the electric energy stored in the resonant capacitor $C_{r1}$ to discharge until zero. This operating mode terminates as the switch $S_1$ turns on.

Figure 6J:
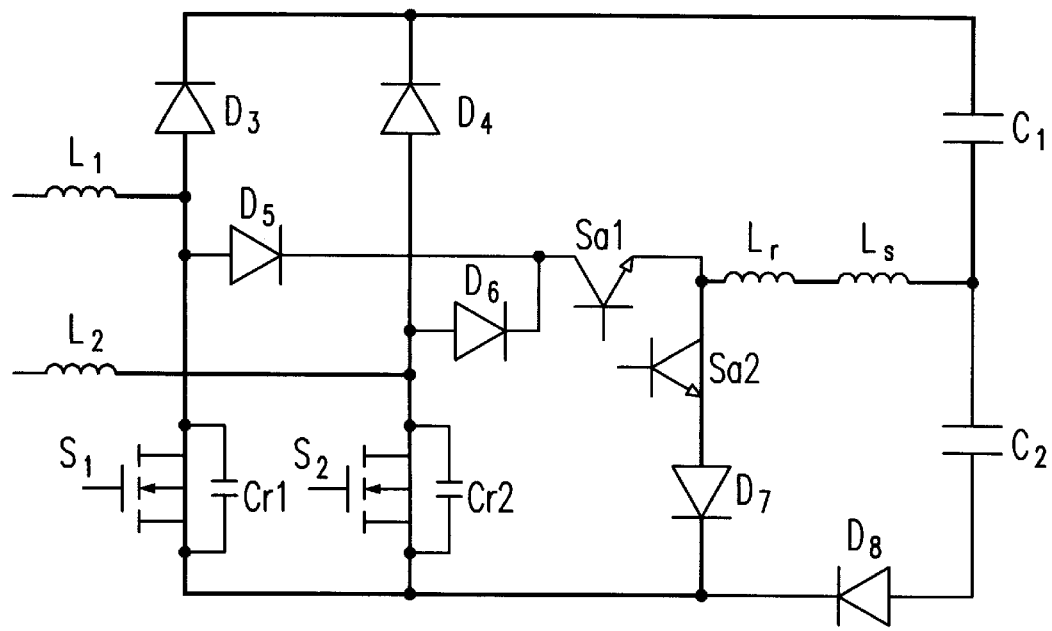

Please refer to FIG. 6(j). This operating mode is similar to the operating mode of FIG. 6(c). This operating mode starts by detecting if the voltage across the resonant capacitor $C_{r1}$ (which is also indicative of the drain-source voltage of the switch $S_1$) is approaching zero to drive the switch $S_1$ to turn on. In this operating mode, the electric energy stored in the resonant inductor Lr is linearly discharged to the output capacitor C2 through the switch $S_1$, $S_2$, diodes $D_3$, $D_4$, $D_7$ and the unidirectional switch $S_{a2}$. This operating mode terminates as the electric energy stored in the inductor $L_r$ is fully discharged. Because the switch $S_{a2}$ is a unidirectional switch, even the driving signal for the switch $S_{a2}$ is high, the switch $S_{a2}$ will automatically turn off, and further it is turned off at a zero current circumstances.

Figure 6K:
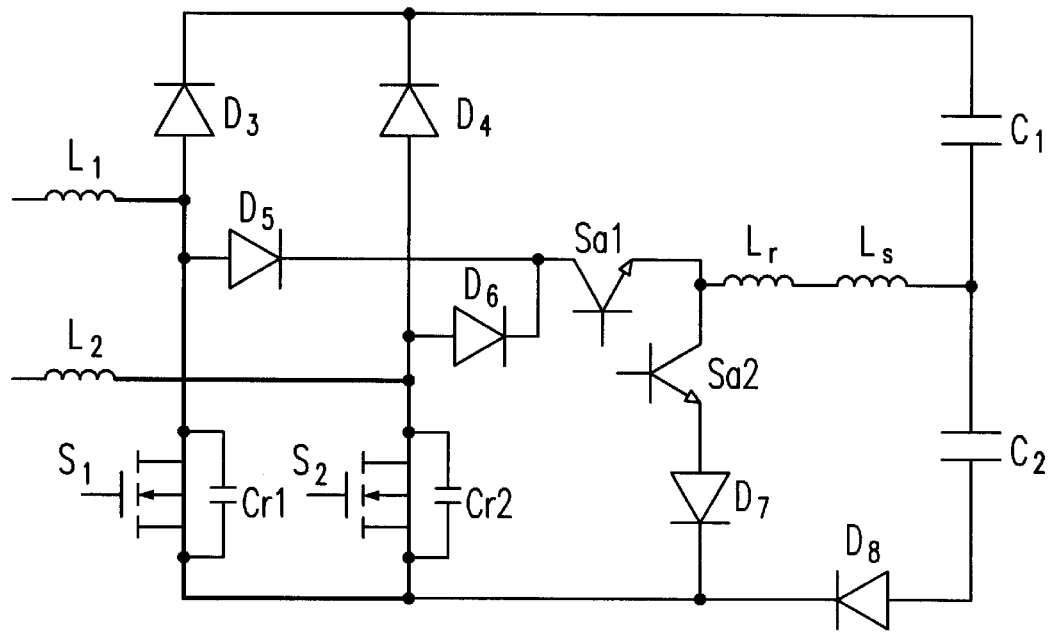
Figure 6:
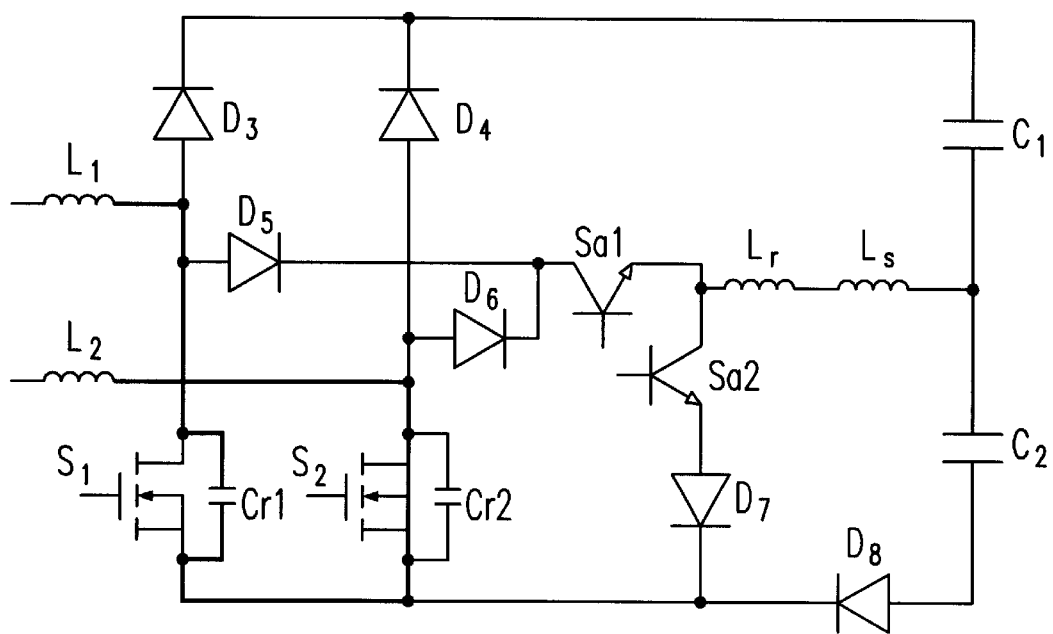
Figure 7:
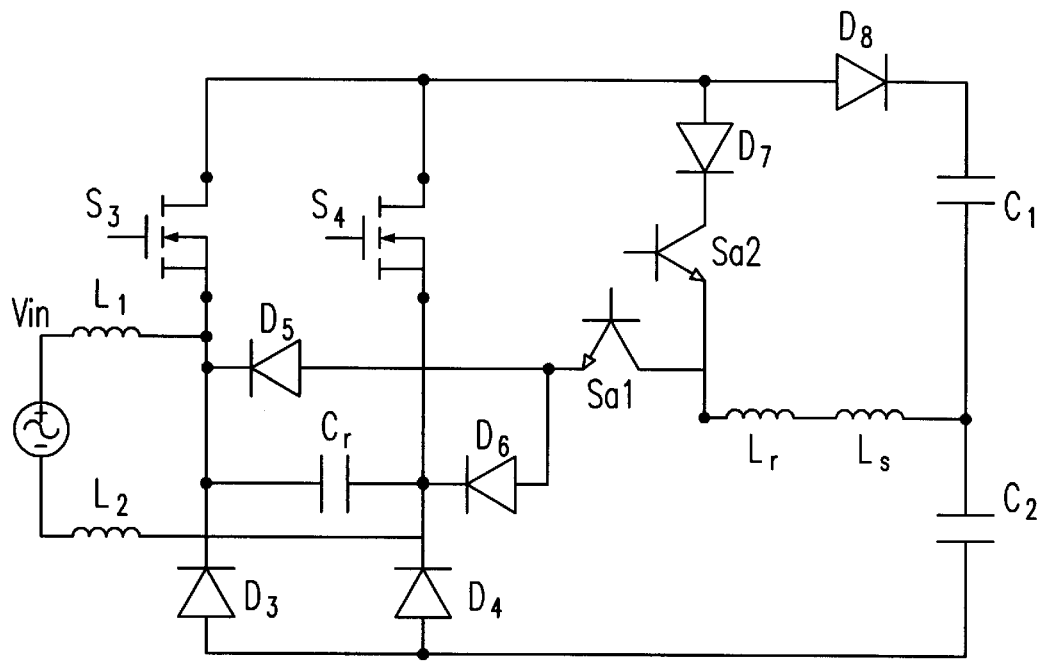
FIG. 7 to FIG. 13 demonstrate other possible embodiments of the boost converter adapted for performing power factor correction according to the present invention.
Figure 8:
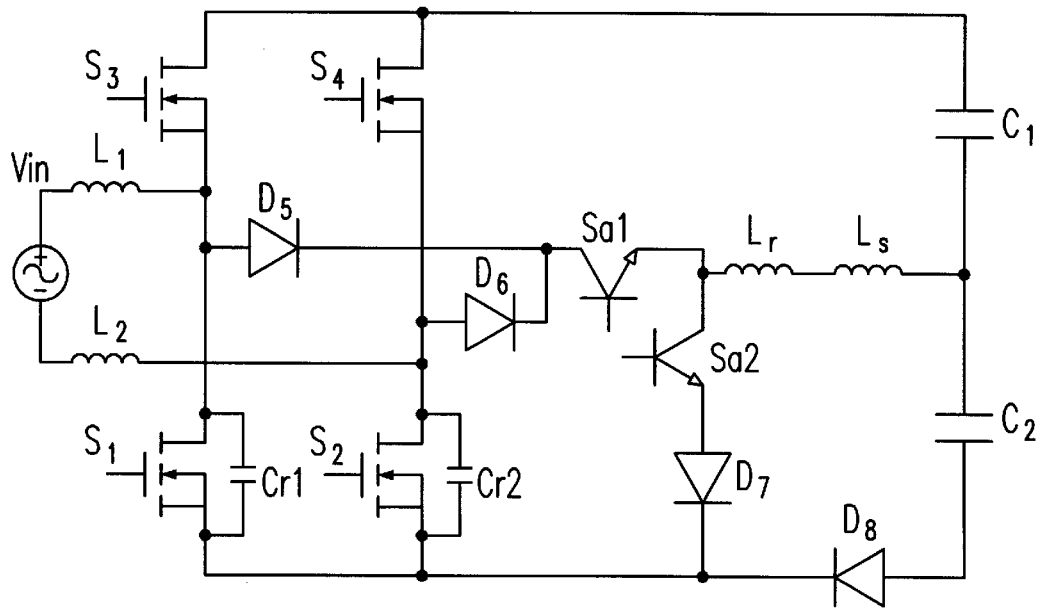
Figure 9:
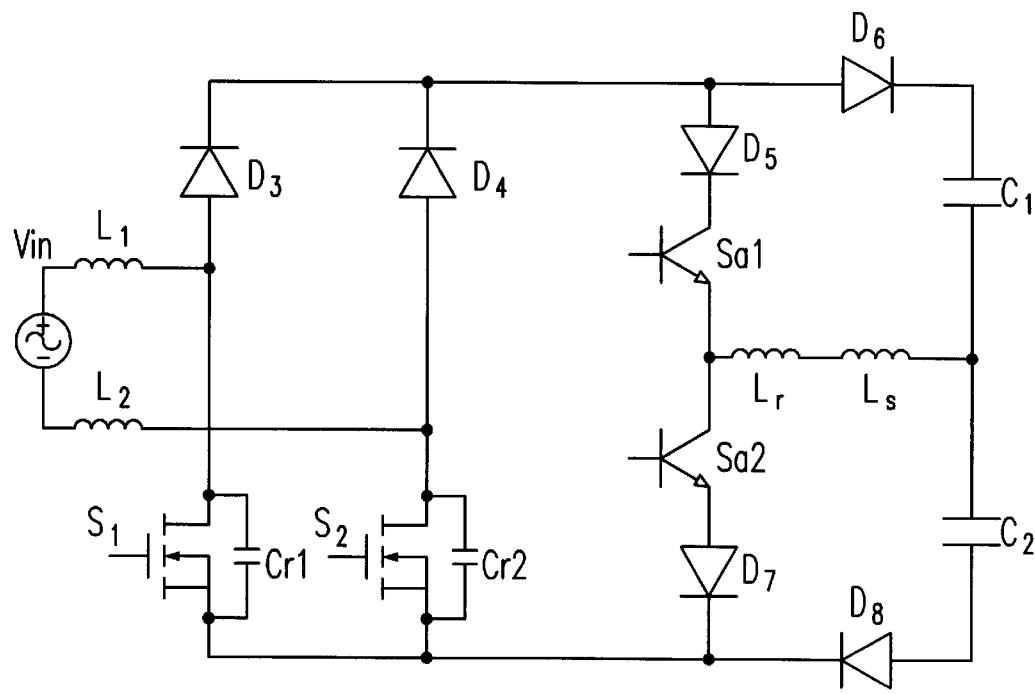
Figure 10:
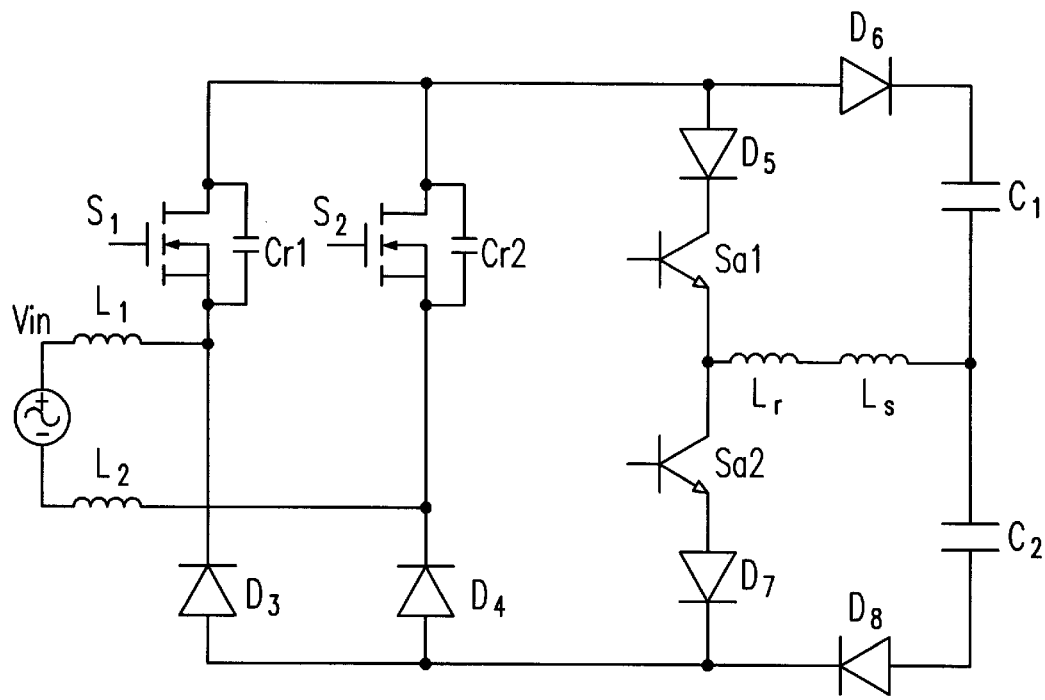
Figure 11:
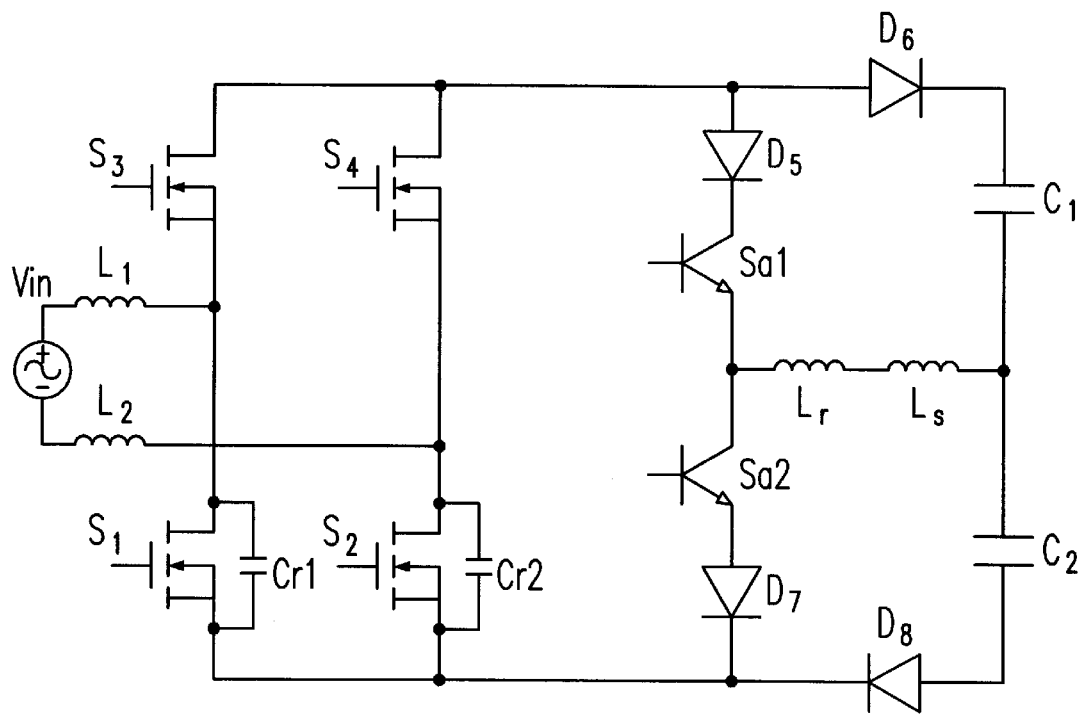
Figure 12:
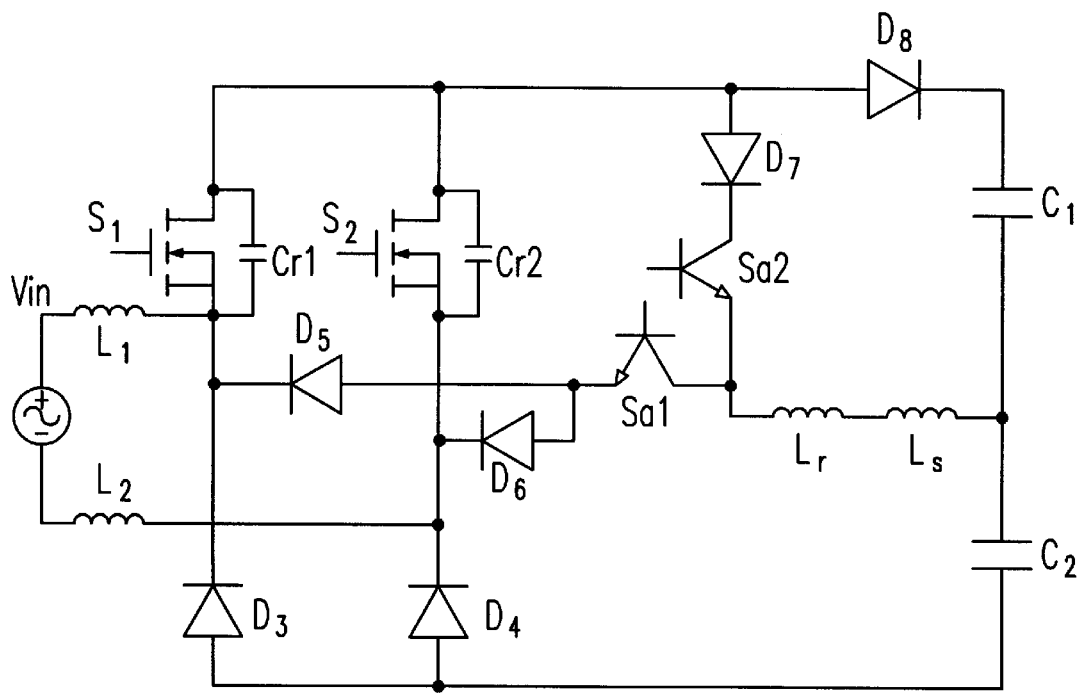
Figure 13:
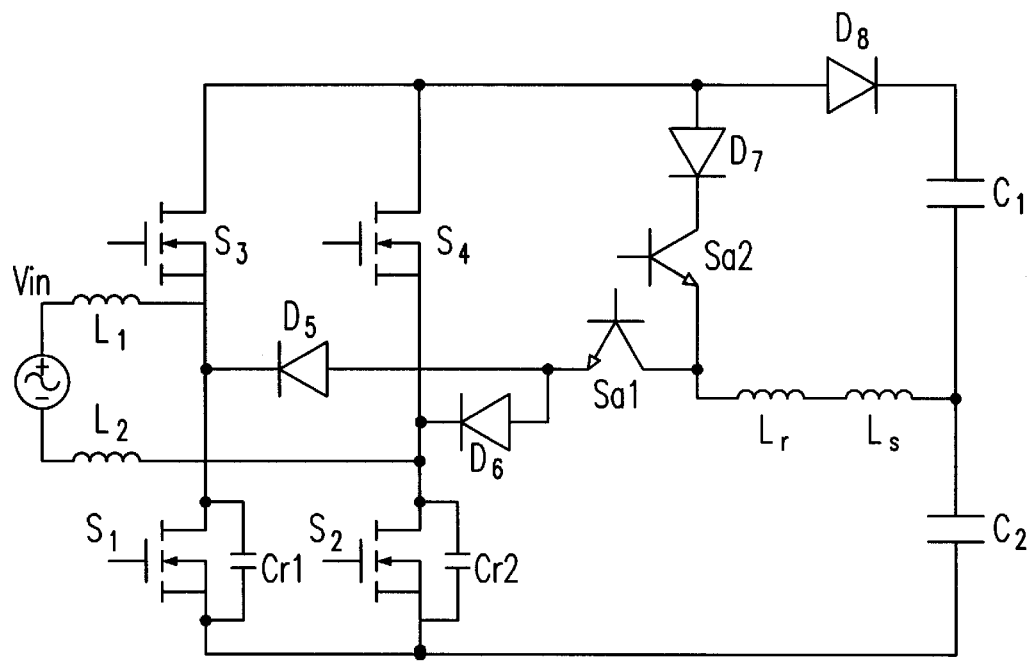

Please refer to FIG. 6(k). This operating mode starts as the energy stored in the resonant inductor $L_r$ is discharged until zero. This operating mode is operatively identical to the charge mode of the conventional boost converter and the operating mode of FIG. 6(e). This operating mode terminates as the PFC driving signal is deasserted, that is, this operating mode terminates as the switch $S_1$ is turned off. As for the operating mode of FIG. 6(l), it is completely identical to the operating mode of FIG. 6(f), and it is intended not to give unnecessary details herein.

The negative half-cycle operation of the boost converter according to the present invention is analogous with the aforementioned positive half-cycle operation procedure, except that the switch $S_2$ is driven to turn on/off under a zero voltage circumstances to enable the resonant capacitor to discharge electric energy to the output capacitor in the positive half-cycle, while the switch $S_1$ is driven to turn on/off under a zero voltage circumstances to enable the resonant capacitor to discharge electric energy to the output capacitor in the negative half-cycle. Therefore, the negative half-cycle operation of the boost converter according to the present invention can be inferred from the descriptions on the half-cycle operating modes and we intend to omit to give a detailed illustration herein.

FIG. 7 to FIG. 13 demonstrate other possible embodiments of the boost converter adapted for performing power factor correction according to the present invention. The circuit topologies of the boost converter of FIG. 7 to FIG. 13 are based on the circuit topology deriving from by slightly modifying part of the circuit configuration of the boost converter of FIG. 3. As can be seen from the boost converter configurations of FIG. 7 to FIG. 13, part of the rectifying circuits are arranged by MOSFET in place of the diodes which are taken as the rectifying devices in the foregoing embodiment. In the light of the circuit structure of FIG. 7 to FIG. 13, it is to be found that the conduction loss incurred by the boost converter is significantly reduced. The MOSFET of the boost converters of FIG. 7 to FIG. 13 functions as a synchronized rectifier, and it is active within the time period where after the diodes are turned on and before they are turned off. It can be known from the above discussions that the power factor correction converter of the present invention is driven to enable the switches to switch their on/off states under a zero voltage/zero current circumstances, and further the rectifying circuit is formed from a number of rectifying devices with a lower forward voltage. In view of these advantageous respects of the present invention, it is to be understood that the power factor correction converter of the present invention can result in a lower conduction loss, a lower switching loss, a miniaturized magnetic element, a suppressed EMI and RFI and an optimized overall performance.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A boost converter comprising:
   a resonant unit comprising a first switch, a second switch, and a resonant circuit at least comprising two energy storage elements, wherein said resonant unit is operatively configured to alternatively discharge an electric energy from one of said energy storage elements to a capacitive load; and
   a boost unit comprising a boost choke for receiving an alternating current voltage, a rectifying circuit coupled between said boost choke and said resonant unit, a third switch and a fourth switch respectively connected across one of said energy storage elements.

2. The boost converter of claim 1 wherein said resonant unit is operatively configured to respectively turn said first switch and said second switch on and off under a zero current circumstances.

3. The boost converter of claim 1 wherein said boost unit is operatively configured to respectively turn said third switch and said fourth switch on and off under a zero voltage circumstances.

4. The boost converter of claim 1 wherein said capacitive load comprises a first output capacitor and a second output capacitor.

5. The boost converter of claim 1 wherein said resonant circuit comprises an inductor, a first capacitor and a second capacitor.

6. The boost converter of claim 5 further comprising a saturation inductor coupled between said inductor of said resonant circuit and said load for reducing a high-frequency ringing of said resonant circuit.

7. The boost converter of claim 1 wherein both said first switch and said second switch comprise a unidirectional switch element.

8. The boost converter of claim 7 wherein said unidirectional switch element comprises one selected from a silicon-controlled rectifier and an insulated gate bipolar transistor with a relatively high collector-emitter reverse-biased voltage with gate opened ($V_{CEO}$).

9. The boost converter of claim 7 wherein said unidirectional switch element comprises one selected from an insulated gate bipolar transistor and a metal-oxide-semiconductor field effect transistor.

10. The boost converter of claim 9 further comprising a diode coupled in series with said second switch.

11. The boost converter of claim 1 wherein said rectifying circuit comprises a first rectifier, a second rectifier and a third rectifier.

12. The boost converter of claim 11 wherein each of said first rectifier, said second rectifier and said third rectifier comprises one selected from an ultra fast recovery diode and a metal-oxide-semiconductor field effect transistor.

13. The boost converter of claim 1 further comprising a first auxiliary rectifier and a second auxiliary rectifier.

14. The boost converter of claim 13 wherein both said first auxiliary rectifier and said second auxiliary rectifier comprise an ultra fast recovery diode.

15. The boost converter of claim 1 further comprising an inductor coupled between one side of said alternating current voltage and a circuit node of said fourth switch for reducing a common-mode noise of said boost converter.

16. A power factor correction converter comprising:
a resonant unit comprising a first switch, a second switch, and a resonant circuit at least comprising two energy storage elements, wherein said resonant unit is operatively configured to alternatively discharge an electric energy from one of said energy storage elements to a capacitive load; and
a boost unit comprising a boost choke for receiving an alternating current voltage, a rectifying circuit coupled between said boost choke and said resonant unit, a third switch and a fourth switch respectively connected across one of said energy storage elements; and
a power factor correction controller which issues a first switch control signal to drive said first switch to turn on and off when a current flowing through said first switch is zero and issues a second switch control signal to drive said second switch to turn on and off when a current flowing through said second switch is zero, and issues a third switch control signal to drive said third switch to turn on and off when a voltage across said third switch is zero and issues a fourth switch control signal to drive said fourth switch to turn on and off when a voltage across said fourth switch is zero.

17. The power factor correction converter of claim 16 further comprises a zero voltage detector which respectively detects a voltage across said third switch and a voltage across said fourth switch, and issues a first control signal to drive said power factor correction controller to issue said third switch control signal when said voltage across said third switch is zero and issues a second control signal to drive said power factor correction controller to issue said fourth switch control signal when said voltage across said fourth switch is zero.

18. The power factor correction converter of claim 16 wherein said resonant unit is operatively configured to respectively turn said first switch and said second switch on and off under a zero current circumstances.

19. The power factor correction converter of claim 16 wherein said load comprises a first output capacitor and a second output capacitor.

20. The power factor correction converter of claim 16 wherein said resonant circuit comprises an inductor, a first capacitor and a second capacitor.

21. The power factor correction converter of claim 20 further comprising a saturation inductor coupled between said inductor of said resonant circuit and said load for reducing a high-frequency ringing of said resonant circuit.

22. The power factor correction converter of claim 16 wherein both said first switch and said second switch comprise a unidirectional switch element.

23. The power factor correction converter of claim 22 wherein said unidirectional switch element comprises one selected from a silicon-controlled rectifier and an insulated gate bipolar transistor with a relatively high collector-emitter reverse-biased voltage with gate opened ($V_{CEO}$).

24. The power factor correction converter of claim 22 wherein said unidirectional switch element comprises one selected from an insulated gate bipolar transistor and a metal-oxide-semiconductor field effect transistor.

25. The power factor correction converter of claim 24 further comprising a diode coupled in series with said second switch.

26. The power factor correction converter of claim 16 wherein said rectifying circuit comprises a first rectifier, a second rectifier and a third rectifier.

27. The power factor correction converter of claim 26 wherein each of said first rectifier, said second rectifier and said third rectifier comprises one selected from an ultra fast recovery diode and a metal-oxide-semiconductor field effect transistor.

28. The power factor correction converter of claim 16 further comprising a first auxiliary rectifier and a second auxiliary rectifier.

29. The power factor correction converter of claim 28 wherein both said first auxiliary rectifier and said second auxiliary rectifier comprise an ultra fast recovery diode.

30. The power factor correction converter of claim 16 further comprising an inductor coupled between one side of said alternating current voltage and a circuit node of said fourth switch for reducing a common-mode noise of said power factor correction converter.

* * * * *